Patented Oct. 27, 1942

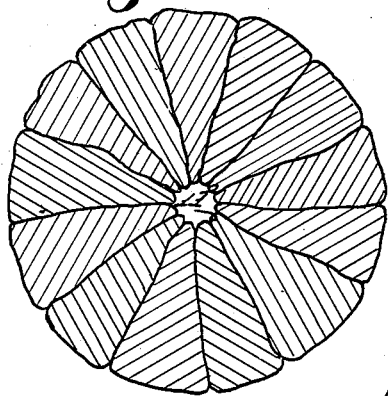
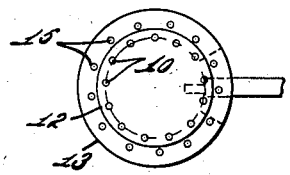
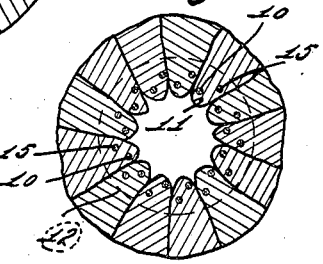
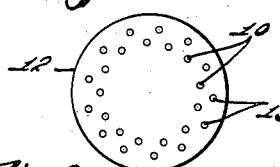
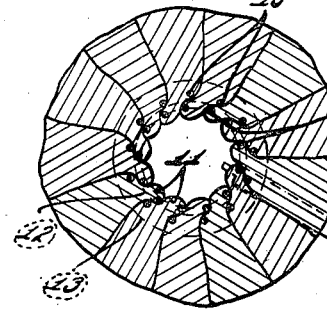
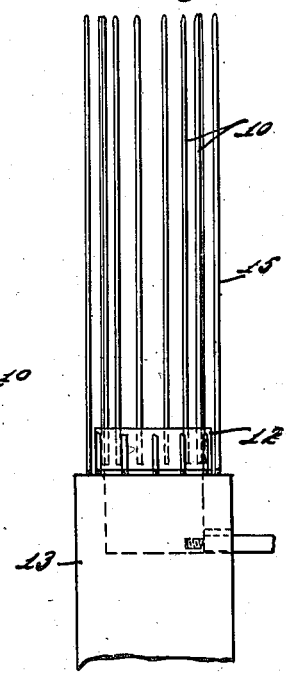
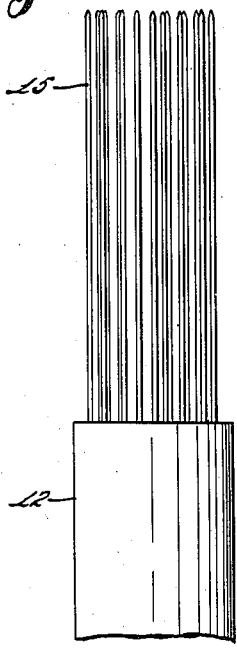

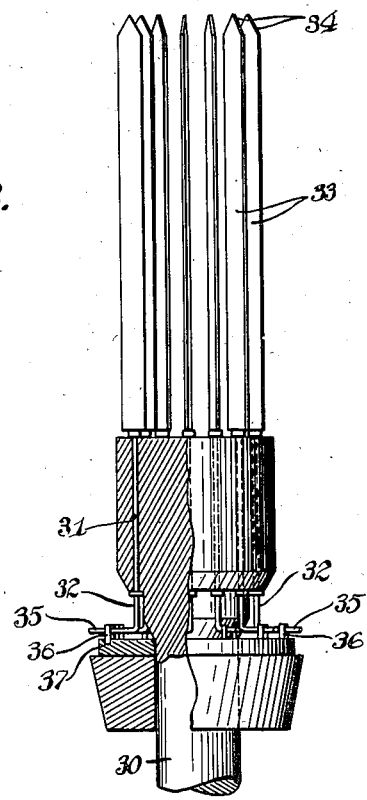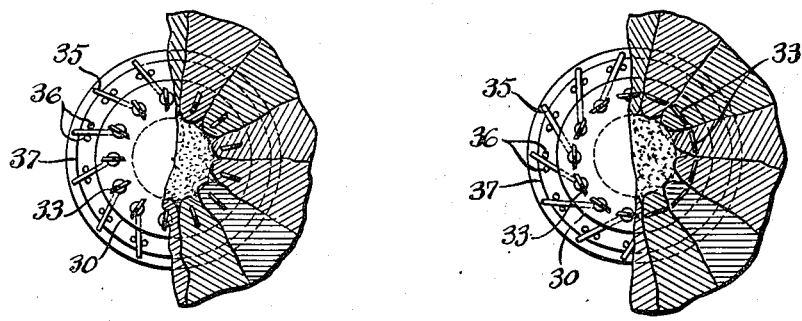

2,300,311

UNITED STATES PATENT OFFICE 2,300,311

HOLDING FORK FOR CITRUS FRUITS

Ralph Polk, Sr., Miami, and Ralph Polk, Jr., Haines City, Fla., assignors to The Polk Development Company, Tampa, Fla., a copartnership of Florida Application June 7, 1939, Serial No. 277,848

4 Claims. (Cl. 146—3)

In preparing citrus fruits, such as grape fruit, for canning, it is necessary to separate the segment-shaped juice-cell groups from the inedible radiating integuments. To perform this operaing mechanically, mechanisms such as are shown in Patents 2,121,098 and 2,129,101, have been put into commercial operation.

In order to support the peeled fruit for manipulation, it has heretofore been customary to provide a holding fork comprising a main stem or head and a circular series of small diameter tines, circumferentially spaced and so sized and proportioned that the tines could be caused to penetrate the peeled fruit parallel with the axis of the core of the fruit with the several tines lying within the apices of the fruit segments radially just outside the roots of the V's formed by the radiating integuments. The group of tines serves to hold the integuments as a bonded group during further manipulation.

In grape fruit the apices of the V-shaped integuments are radially spaced from the polar axis of the fruit. In the seeded varieties the space within the apices of the integuments is filled with a pithy core which provides some radial bonding for the integuments, and holding forks, such as have been described above, serve adequately to hold the integuments during the operation of removal of the juice-cell groups.

In the seedless varieties the bond between adherent radial integuments is generally weaker than in the seeded varieties and, generally, there is no pithy core. Consequently, holding forks of the above-described character are not satisfactory unless they are so accurately proportioned and injected that the tines fit closely in the apices of a majority of the fruit segments.

Such accurate proportioning and injection is not commercially practicable and the object of our present invention is to provide an improved holding implement which will afford a better anchorage for the fruit, especially fruits of the seedless type.

The accompanying drawings illustrate our invention:

Fig. 1 illustrates a section of a peeled citrus fruit on a diametrical plane at right angles to the polar axis;

Fig. 2 a plan, full size, of one form of our improved tool;

Fig. 3 an elevation of the tool shown in Fig. 2;

Fig. 4 a plan of another form;

Fig. 5 an elevation of the tool shown in Fig. 4;

Fig. 6 a sectional diagram illustrating the operation of the tool shown in Fig. 3;

Fig. 7 a sectional diagram illustrating the operation of the tool shown in Fig. 4;

Fig. 8 an elevation of another form of tool;

Fig. 9 a plan of the tool shown in Fig. 8 with the blade prongs in fruit piercing position; and Fig. 9A a plan of the tool shown in Fig. 8 showing the blade prongs in integument gripping position;

In the drawings 10, 10 indicate small diameter tines having a length somewhat greater than half a fruit diameter, arranged in a circular series on a radius slightly greater than the average radial spacing of the outer surfaces of the fruit integuments 11 within their apices plus a tine radius so that these tines, when projected polarwise into a fruit, will lie quite closely within the apices of the fruit segments. The number of tines conveniently equals the average number of segments found in the fruit to be operated on and the tines 10 are equally spaced circumferentially. Tines 10 are carried by a head 12.

The size and arrangement of fruit segments vary through a considerable range and the tines may not be too closely spaced. Consequently, with a single circular series of tines it often occurs that several of the juice-cell groups of a fruit will not be tine penetrated, and therefore not tine anchored for further manipulation.

If the number of tines in a circular series be increased, to insure segment penetration, the circumferential spacing becomes so close as to unduly increase resistance to fruit penetration and the fruit is torn during penetration by the tines.

To meet this difficulty, we provide a second circular series of tines 15 arranged on a radius such that the tines 15 will be radially outwardly spaced from the tines 10 a distance approximately the thickness of two adherent radial integuments 11, or a trifle less.

Tines 15 may be carried by head 12, in fixed relation to tines 10, (Figs. 2 and 3) and when so carried should be circumferentially staggered relative to tines 10. Tines 15 may be carried, as shown in Fig. 5, by a stem 13, within which head 12 is rotatively adjustable. When so mounted, head 12, prior to fruit penetration, will be set so that tines 10 will be circumferentially staggered relative to tines 15 to afford maximum clearance between the two series 10 and 15. After fruit penetration, one series of tines will be circumferentially shifted relative to the other so as to kink the integuments between the tines of the two series (Fig. 7) and thus increase the anchorage of the integuments against radial displacement and against rupture of the natural bonds between adherent radial integuments.

In Figs. 8 and 9 the main rotatable spindle 30 is provided with a circumferential series of circumferentially spaced bearings 31 which are parallel to the axis of shank 39. Journaled in each bearing 31 is a shaft 32, the upper end of which projects from the upper end of spindle 30 and carries a thin, narrow, uniform-width blade-like tine 33 preferably sharpened or tapered at its upper end 34.

Shaft 32 is provided with a radial projection 35 engageable by a pair of pins 36 carried by a ring 37 journaled on spindle 30, the arrangement being such that by oscillating ring 37 the blade tines 3 may be positioned either radially of the group, as shown in Fig. 9, or tangentially, as shown in Fig. 9A.

The segments of a citrus fruit do not extend to the axis of the fruit and the tool is so proportioned that the blade-like tines will enter individual segments of the fruit between their radial integuments, a short distance radially outwardly from the apices of the integuments and the widths of these blade-like tines are such that, when they are swung about the axes of their shafts 32, they will closely approximate the angular extent of the fruit segments at the circumference of penetration so that adjacent edges of adjacent prongs, approaching the intermediate adherent radial integuments of the two segments, will be pinched between the said adjacent edges of the prongs.

We claim as our invention:

1. A holding fork for whole peeled citrus fruits comprising, two concentric circular series of parallel circumferentially spaced tines anchored in a suitable holder with their free ends all pointed in the same direction, one series of tines being radially spaced and angularly adjustable relative to the other series.

2. A holding fork for whole peeled citrus fruits, comprising a main body and a circular series of circumferentially-spaced parallel blade-like prongs separately journalled in the main body and oscillable about parallel axes, and means by which said blades may be oscillated from a position substantially radial to the axis of the blade group to position approaching circular continuity, whereby bonded radial integuments may be contacted by edges of the blade prongs.

3. A holding fork for whole peeled citrus fruits, comprising a main body, and a multiplicity of fruit penetrating tines carried by said main body with all free ends thereof projecting in the same direction and so arranged about a common axis and spaced circumferentially that they may be projected polarwise into a plurality of fruit segments between their radial integuments closely adjacent the vertices thereof, adjacent tines being relatively movable toward and from intermediate bonded radial integuments of the fruit.

4. A holding fork for whole peeled citrus fruits comprising, a main body supporting a plurality of associated fruit-penetrating elements each having a free end all of which are pointed in the same direction and having lengths exceeding half a fruit diameter and capable of penetrating a fruit parallel with and closely adjacent the apices of the fruit segments, at least one of said elements being movable relative to an adjacent element to pinch an integument of the fruit therebetween.

RALPH POLK, Sr.
RALPH POLK, Jr.